US007325360B2

(12) United States Patent
Mazouzi et al.

(10) Patent No.: US 7,325,360 B2
(45) Date of Patent: Feb. 5, 2008

(54) CABLE TENSIONER AND WINDOW REGULATOR EQUIPPED WITH A CABLE TENSIONER

(75) Inventors: Mustapha Mazouzi, Villiers sur Marne (FR); Pradet Marc, La Ferté St Aubin (FR)

(73) Assignee: ArvinMeritor Light Vehicle Systems - France, Sully-sur-Loire (FR)

( * ) Notice: Subject to any disclaimer, the term of this patent is extended or adjusted under 35 U.S.C. 154(b) by 50 days.

(21) Appl. No.: 10/878,978

(22) Filed: Jun. 28, 2004

(65) Prior Publication Data

US 2004/0262442 A1    Dec. 30, 2004

(30) Foreign Application Priority Data

Jun. 27, 2003    (FR) .................................. 03 07820

(51) Int. Cl.
  *E05F 11/48*    (2006.01)
  *F16C 1/22*    (2006.01)
(52) U.S. Cl. ..................... 49/352; 74/501.5 R; 254/231
(58) Field of Classification Search ................. 49/352; 74/501.5 R; 403/359.2, 359.5; 411/329, 411/949; 254/231, 232, 233, 234
See application file for complete search history.

(56) References Cited

U.S. PATENT DOCUMENTS

| 742,332 | A | * | 10/1903 | Kunny et al. ............ 188/82.77 |
|---|---|---|---|---|
| 1,703,947 | A | * | 3/1929 | Nation ....................... 411/329 |
| 1,722,231 | A | * | 7/1929 | Penney et al. ............... 411/326 |
| 2,220,288 | A | * | 11/1940 | Sarosdy ....................... 254/232 |
| 2,730,154 | A | * | 1/1956 | Aspey ......................... 411/321 |
| 2,930,659 | A | * | 3/1960 | Knight ......................... 384/16 |
| 3,157,062 | A | * | 11/1964 | Bernard ................. 74/501.5 R |
| 3,587,341 | A |  | 6/1971 | Fiddler |
| 3,759,352 | A | * | 9/1973 | Toplis .................... 74/501.5 R |
| 4,274,300 | A | * | 6/1981 | Golobay ................. 74/501.5 R |
| 4,334,438 | A | * | 6/1982 | Mochida ..................... 74/502.4 |
| 4,753,124 | A | * | 6/1988 | Chevance .............. 74/501.5 R |
| 4,798,100 | A |  | 1/1989 | Baumgarten |
| 4,833,937 | A | * | 5/1989 | Nagano ................. 74/501.5 R |
| 4,840,080 | A | * | 6/1989 | Kobayashi et al. .... 74/501.5 R |
| 5,564,314 | A | * | 10/1996 | Gabas .................... 74/501.5 R |
| 5,746,094 | A | * | 5/1998 | Medebach et al. ......... 74/502.4 |
| 6,093,892 | A |  | 7/2000 | Arimoto |

FOREIGN PATENT DOCUMENTS

| DE | 196 03 893 | 11/1996 |
|---|---|---|
| EP | 0 244 3030 | 4/1987 |
| FR | 2 493 943 | 5/1982 |

OTHER PUBLICATIONS

French Search Report dated Mar. 15, 2004.

* cited by examiner

*Primary Examiner*—Gregory J. Strimbu
(74) *Attorney, Agent, or Firm*—Carlson, Gaskey & Olds

(57) ABSTRACT

A cable tensioner includes two members, such as a pipe and a tube, that define a cable path. The members are helically mobile relative to each other. A retractable detent permits the relative movement of the members in one direction and prevents the relative movement of the members in another direction. The cable tensioner is thus irreversible, regardless of the operating conditions. The cable tensioner is, for example, applicable to a cable used in a vehicle window regulator. The window regulator cable extends in a protective sheath. One end of the protective sheath abuts against the second member, and the second member acts on the end of the protective sheath to increase the cable path and cable tension.

23 Claims, 3 Drawing Sheets

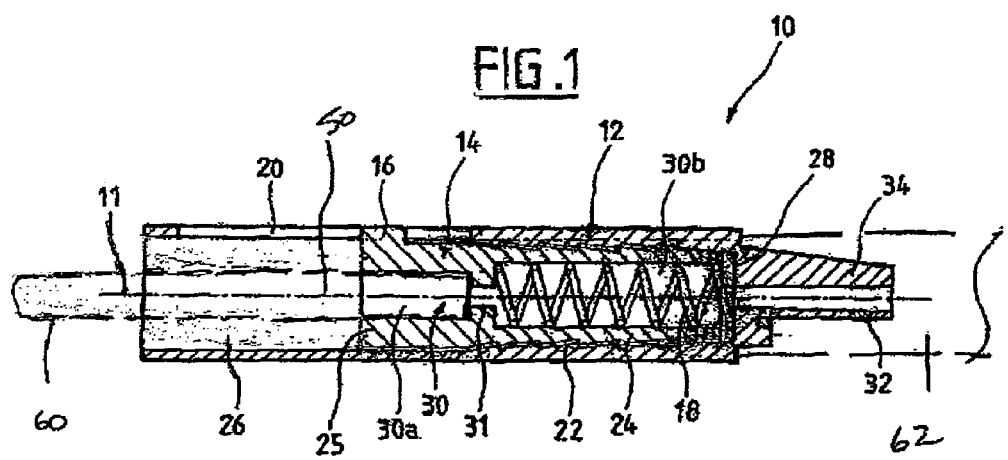
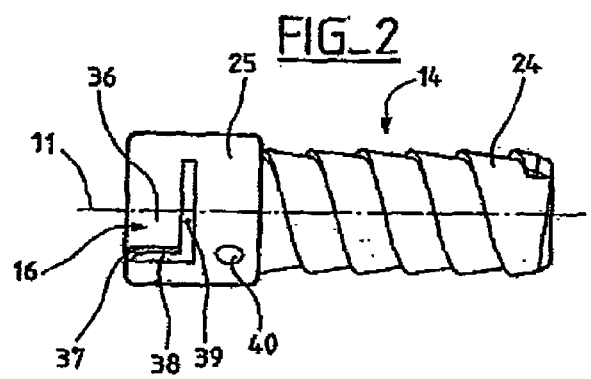
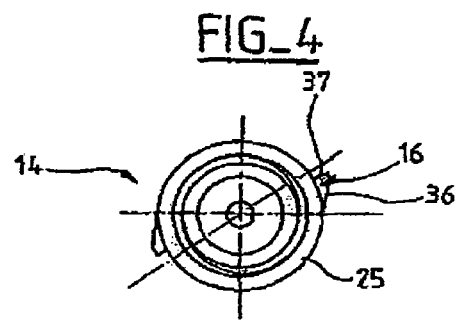

FIG_3
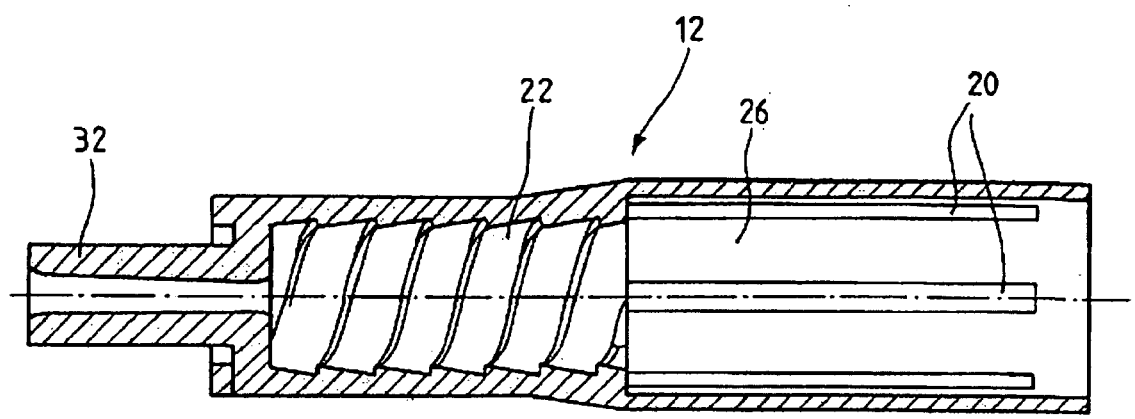
FIG_5
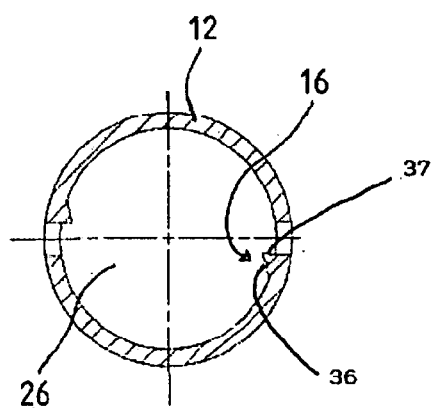

CABLE TENSIONER AND WINDOW REGULATOR EQUIPPED WITH A CABLE TENSIONER

REFERENCE TO RELATED APPLICATIONS

This application claims priority to French Patent Application No. FR 03 07 820 filed on Jun. 27, 2003.

TECHNICAL FIELD

This invention relates to a cable tensioner and a window regulator including a cable tensioner.

BACKGROUND OF THE INVENTION

European Patent Application 244 303 discloses a screw and nut device that is subject to alternate axial forces in two directions. The thread of the screw has determined helix and pressure angles that are selected so that the screw can cause a translation and a rotation in the nut under an axial thrust exerted in a first direction (termed reversible) by a spring, and so that the screw cannot cause either a translation or a rotation in the nut when subjected to axial thrust in a second direction opposite to the first direction (termed irreversible) by the spring. The assembly can compensate for automatic play in systems subject to alternate longitudinal forces, such as electric motor shafts or cable controls.

A disadvantage of this system is that under certain conditions, such as when moisture or grease are present, the device is no longer irreversible. When the screw undergoes the axial thrust in the second direction from the spring, the screw causes an undesirable translation and rotation in the nut. The assembly that compensates for play therefore becomes ineffective.

There is therefore a need for a play compensation device that is effective under all conditions.

SUMMARY OF THE INVENTION

The present invention provides a cable tensioner including two members that define a cable path. The members are helically moveable relative to each other. A detent permits the relative movement of the members in one direction and prevents the relative movement of the members in another direction.

According to one embodiment, the detent is retractable. According to another embodiment, the detent is retractable in one direction of rotation and is non-retractable in the other direction of rotation.

According to one embodiment, the tensioner also includes a spring that acts on one member relative to the other member. According to another embodiment, the members are a pipe and a tube, and the tube is translatably mobile along the pipe. According to one embodiment, the detent can be retracted into the tube. According to another embodiment, the detent is held by the pipe.

According to another embodiment, the pipe includes a groove along the cable path, and the detent enters the groove.

According to one embodiment, the detent has a sloped face extending tangentially to the tube. According to another embodiment, the detent includes a stop extending radially to the tube.

According to one embodiment, one of the members includes two detents and the other member includes grooves that the detents enter. According to another embodiment, the angular spacing of the detents is not proportionate to the angular spacing of the grooves. According to another embodiment, the angular spacing of the detents is proportional to the angular spacing of the grooves.

The invention also relates to a window regulator including a tensioner according to one of the previous embodiments.

Other characteristics and advantages of the invention are given in the following detailed description of the embodiments of the invention, given by way of example only and with reference to the drawings.

BRIEF DESCRIPTION OF THE DRAWINGS

FIG. 1 is a cross-sectional view of a cable tensioner;
FIG. 2 illustrates a first member of the cable tensioner;
FIG. 3 illustrates a second member of the cable tensioner;
FIG. 4 illustrates an end view of the second member of the tensioner;
FIG. 5 illustrates a cross-sectional view of an alternate embodiment of the first member of the tensioner.

DETAILED DESCRIPTION OF THE PREFERRED EMBODIMENT

Figure 6:
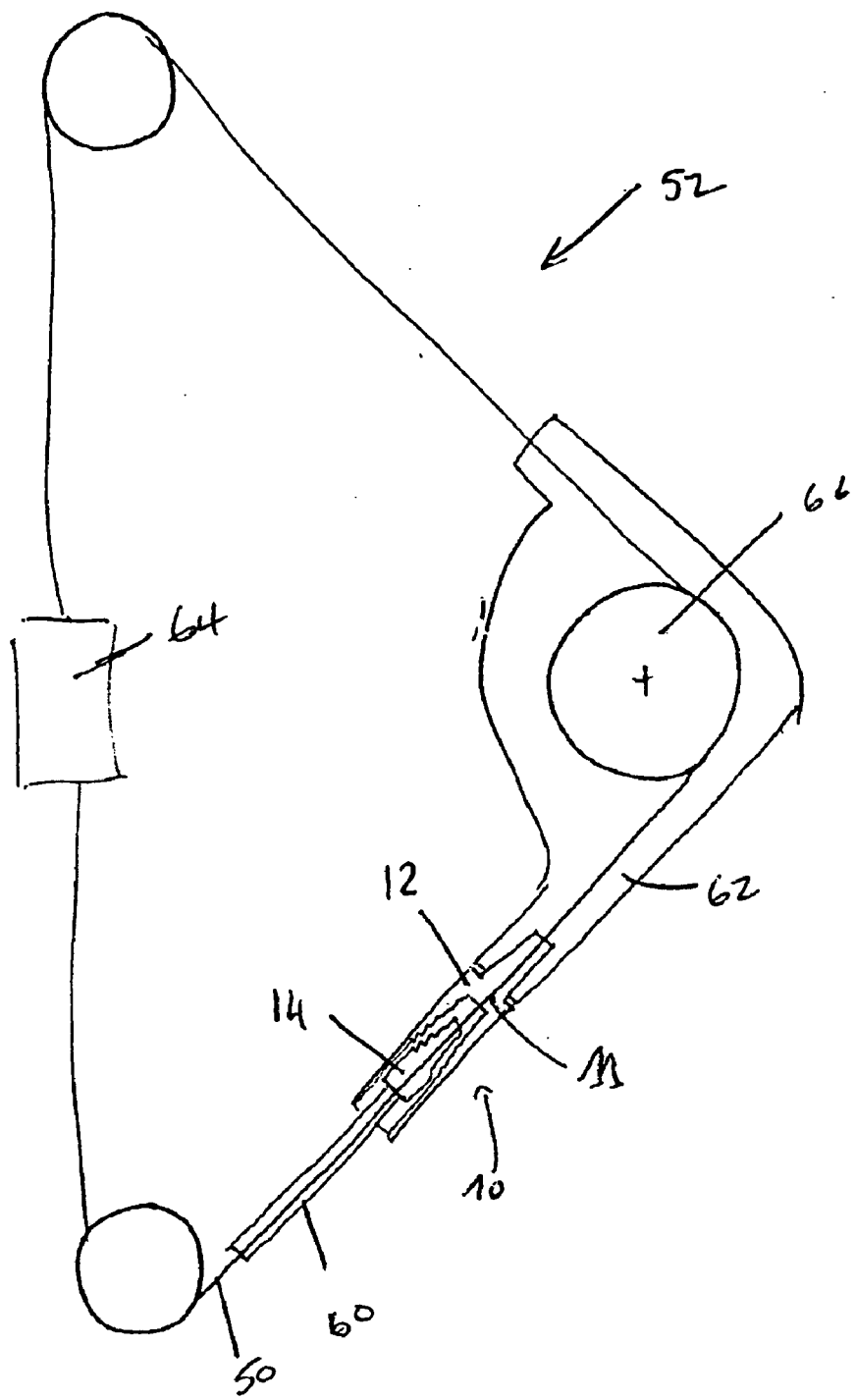
FIG. 6 schematically shows a window regulator.

The present invention provides a cable tensioner including two members that define a cable path and that are helically moveable relative to each other. The cable tensioner also includes a detent that permits the relative movement of the members in one direction but prevents the relative movement of the members in another direction. The cable tensioner is thus irreversible regardless of the operating conditions.

FIG. 1 shows a cable tensioner 10 including a first member 12 and a second member 14. The two members 12 and 14 define a cable path along an axis 11. The two members 12 and 14 are helically moveable relative to each other along the axis 11, allowing the length of the cable path to be increased to tighten the cable 50. In FIG. 1, movement of the second member 14 to the left increases the length of the cable path.

The cable tensioner 10, for example, can be employed with a cable 50 used in a vehicle window regulator 52 (see FIG. 6). The cable 50 extends in a protective sheath 60, and one end of the protective sheath abuts against the second member 14 from the left in FIG. 1. The movement of the second member 14 to the left acts on the end of the protective sheath, increasing the length of the cable path to maintain the cable tension.

FIG. 1 shows an embodiment in which the first member 12 is a pipe and the second member 14 is a tube. The first member 12 includes a bore 26 along part of its length that extends from one end of the first member 12 to a bottom 28. The bore 26 includes a female thread 22 along at least a part of the length. The cable tensioner 10 also includes a neck 32 that extends along the axis 11 at the other end of the first member 12. The neck 32 has a smaller diameter than the first member 12. The neck 32 centers the cable tensioner 10 around the cable 50, and along the axis 11 when the cable tensioner 10 is fitted to a window regulator 52. Moreover, the cable tensioner 10 also includes a rib 34 along the axis 11 of the neck 32 that prevents the cable tensioner 10 from rotating about the axis 11 when fitted to the window regulator 52, for example on a motor support plate or drum support 62.

The second member 14 includes a hole 30 that opens out at either end of the second member 14. The hole 30 is split into two sections 30a and 30b by an annular collar 31, which allows the cable 50 to pass along the axis 11. The section 30a is used to receive the protective sheath, which rests against a side of the annular collar 31.

The section 30a of the hole 30 thus allows the protective sheath to be immobilized transversely to the axis 11. The section 30b of the hole 30 is a sleeve that receives a spring 18 that will be described below.

The second member 14 enters the bore 26 in the first member 12 and is mobile along the axis 11. The female thread 22 in the first member 12 cooperates with a male thread 24 around the second member 14 to cause the helical movement. The second member 14 is inserted through the opening of the bore 26 and is then screwed into the bore 26. One end of the second member 14 can abut against the bottom 28 of the bore 26. This end position corresponds to the position in which the cable 50 is the least tightened by the cable tensioner 10 (start position). When the end of the second member 14 moves away from the bottom 28 of the bore 26, the length of the cable tensioner 10 increases along the cable path, increasing the tension in the cable 50.

The relative helical movement allows for accurate, continuous adjustment of the relative position of the two members 12 and 14, preventing the cable 50 from being overtightened. The relative helical movement of the two members 12 and 14 is caused by the relative rotation and the relative translation.

FIG. 1 also shows a detent 16 that permits the relative movement of the members 12 and 14 in one direction and prevents the relative movement of the members 12 and 14 in another direction. The detent 16 renders the movement of one member relative to the other member irreversible, regardless of the operating conditions. When the second member 14 moves to the left in FIG. 1, the cable path and the tension in the cable 50 increases, and the detent 16 permits such movement. However, the detent 16 stops the second member 14 from moving to the right, preventing the cable path and the tension in the cable 50 from decreasing. The detent 16 prevents, for example, the protective sheath on the cable 50 from moving the second member 14 to the right in FIG. 1. The detent 16 only allows the second member 14 to rotate in one direction, thus only allowing for the translation of the second member 14 in one direction along the axis 11.

According to one embodiment, shown in FIG. 1, the second member 14 includes the detent 16, which enters a groove 20 in the first member 12. FIG. 3 shows the first member 12 of the cable tensioner 10. The first member 12 includes the neck 32, a first section including the female thread 22 and a second section including a plurality of grooves 20. The plurality of grooves 20 extend along the axis 11. FIG. 4 shows a side view of the second member 14. The second member 14 includes the detent 16. The second member 14 can also include several detents 16, two being shown in FIG. 4. As shown in FIG. 1, the second member 14 includes a section with the male thread 24 and a head 25, with the detent 16 supported by the head 25. The head 25 cooperates with the surface of the bore 26 in the first member 12. The contacting surfaces of the head 25 and the bore 26 preferably do not have a male or female thread, and the contact between the surfaces are slidable to facilitate the production of these surfaces and to facilitate the cooperation of the detent 16 and the groove 20.

As shown in FIG. 4, the detent 16 protrudes from the side of the second member 14, and in particular from the head 25. The detent 16 includes a sloped face 36 and a stop 37. The sloped face 36 extends tangentially to the circumference of the head 25, and the stop 37 extends along a radius of the head 25.

As shown in FIG. 1, the detent 16 enters a groove 20 in the first member 12. In one direction of rotation of the second member 14 relative to the first member 12, the sloped face 36 cooperates with a side of the groove 20. The detent 16 then permits the relative movement of the first member 12 and the second member 14. For example, in FIG. 1, when the detent 16 is in a groove 20 and the second member 14 rotates clockwise from the position shown in FIG. 4, the sloped face 36 of the detent 16 slides against a side of the groove 20. The sloped face 36 facilitates the extraction of the detent 16 from the groove 20. In FIG. 1, when the detent 16 is in the groove 20 and the second member 14 rotates counter-clockwise from the position shown in FIG. 4, the stop 37 of the detent 16 contacts a side of the groove 20, preventing the detent 16 from leaving the groove 20.

Thus, the detent 16 permits rotation of the second member 14 relative to the first member 12 in one direction of rotation, but prevents rotation in the other direction. The detent 16 prevents the rotational aspect of the helical movement, preventing the translational aspect of the helical movement. The detent 16 is an obstacle to the rotation of the second member 14 in one direction of rotation, rendering the cable tensioner 10 irreversible.

The size of the detent 16 is selected so that it can be extracted from the groove 20 easily in one direction of rotation, but also so that the detent 16 can be immobilized in the groove 20, regardless of the operating conditions.

Due to the sloped face 36, the engagement of the detent 16 in the groove 20 takes place gradually and engagement therefore occurs silently. The cable tensioner 10 therefore allows for a reduction in noise during operation. The stiffness of the detent 16 can be selected to prevent clicking. The shape of the detent 16 can also be selected such that there is no contact between the sloped face 36 and the bore 26.

The detent 16 can be retractable, permitting the relative movement of the members 12 and 14 in the direction that increases the tension in the cable 50. The retraction of the detent 16 reduces the force applied to the two members 12 and 14 to cause their relative movement. In particular, the detent 16 is retractable in one direction of rotation, permitting the relative movement of the two members 12 and 14 in the one direction. In FIG. 1, when the second member 14 is rotated to cause the translation of the second member 14 to the left, the detent 16 retracts.

FIG. 4 shows the second member 14 with the detent 16, which can be retractable. The detent 16 is a hinged tab and may be located at the free end of the head 25 to facilitate production. The detent 16 includes two slots 38 and 39. Slot 39 extends radially, and the other slot 38 extends along the axis 11. The detent 16 is then hinged onto the head 25, forming a hinged tab. The slot 38 is at the foot of the stop 37. Thus, when the second member 14 rotates to slide the sloped face 36 against a side of the groove 20, the detent 16 is pivoted and retracted inside the head 25.

FIG. 5 illustrates a cross-section of the first member 12 and shows another embodiment of the detent 16. In this embodiment, the first member 12 includes the detent 16, and the surface of the bore 26 includes the detent 16. The surface of the bore 26 has the sloped face 36, and the stop 37 is made radially. The detent 16 is shaped like a step in the surface of the bore 26. The detent 16 cooperates with a hinged tab on the second member 14. The head 25 of the second member 14 may include the slot 38 that extends along the axis 11. The slot 38 extends along the entire height of the head 25 and along the axis 11.

In FIG. 5, when the second member 14 rotates counter-clockwise relative to the first member 12, the detent 16 does not obstruct rotation of the second member 14. However, when the second member 14 is driven rotatably in the other direction (clockwise), the detent 16 acts on the tab, which is pushed into the head 25 of the second member 14. The detent 16 slides along the tab from the hinge of the tab to the slot 38. The stop 37 on the detent 16 then abuts against the thickness of the second member 14 to prevent rotation of the second member 14 relative to the first member 12.

FIG. 5 illustrates a cross-sectional view of the first member 12, and the detent 16 extends along at least part of the length of the surface of the bore 26 along the axis 11. The detent 16 can also extend along the entire length of the bore 26. Similarly, the groove 20 extends along at least part of the length of the bore 26. In FIGS. 1 and 3, the groove 20 extends from the end of the bore 26 on the side of the female thread 22 to near the free end of the bore 26. Preferably, the groove 20 does not extend to the right of the free end in order not to weaken the first member 12.

The cable tensioner 10 can include one or more detents 16 and one or more grooves 20. The number of detents 16 on the second member 14 and the number of grooves 20 in the first member 12 are selected depending on the accuracy of the tension to be applied to the cable 50. Combined with the helical movement, the greater the number of detents 16 and grooves 20, the more accurate the tension in the cable 50. Moreover, providing several detents 16 improves the irreversible nature of the cable tensioner 10. FIG. 4 shows the presence of two detents 16. FIG. 3 shows the presence of at least three grooves 20. The same angular spacing can separate the grooves 20 from each other and the detents 16 from each other. The detents 16 thus each engage in a groove 20 at the same time, each of the detents 16 contributing to the irreversibility of the cable tensioner 10. Alternatively, the angular spacing between the grooves 20 can be different from the angular spacing between the detents 16. This allows for an increase in the accuracy of the play compensation in the tension in the cable 50 without considerably increasing the number of the detents 16 and the grooves 20. This also applies to the number of detents 16 in the bore 26 and the number of hinged tabs on the head 25 in the alternate embodiment.

The two members 12 and 14 are mobile relative to each other by a flexible device. For example, the flexible device can be a spring 18 that acts on one member relative to the other member. The spring 18 extends along the axis 11 and allows for the movement along the axis 11, and therefore along the cable path, of one member relative to the other member. In FIG. 1, the spring 18 rests against the annular collar 31 of the second member 14 and on the bottom 28 of the bore 26 of the first member 12. The spring 18 is guided along the axis 11 by the section 30b, forming a sleeve. The spring 18 extends partly in the section 30b, reducing the axial dimensions of the cable tensioner 10. The stiffness of the spring 18 is such that the force exerted along the axis 11 by the spring 18 on the annular collar 31 moves the second member 14 relative to the first member 12. The spring 18 helically moves the two members 12 and 14. The second member 14 rotates around the axis 11 and translates to the left in FIG. 1. If the cable tensioner 10 includes a plurality of detents 16 and grooves 20, the detents 16 are extracted from one groove 20 and engage in an angularly adjacent groove 20. The engaged detents 16 prevent the reverse movement of the second member 14 by the stop 37. The detents 16 prevent the protective sheath on the cable 50 from moving the second member 14 and exerting a force along the axis 11 against the force of the spring 18. The detents 16 thus prevent a reduction in the cable path and the tension in the cable 50. This also applies to the embodiment including the detents 16 in the bore 26 of the first member 12 and the hinged tabs on the head 25 on the second member 14.

The detent 16 also counters any excessive force from the protective sheath along the axis 11 that would tend to push the second member 14 against the bottom 28 of the bore 26 of the first member 12 and reduce the tension applied to the cable 50. This pushing is accompanied by a clicking noise, the cable tensioner 10 and the detent 16 prevent this noise.

FIG. 2 shows a hole 40 in the second member 14. The hole 40 is, for example, radial and allows a pin (not shown) to be inserted to immobilize the two members 12 and 14 relative to each other. For example, the pin allows the spring 18 to be compressed between the bottom 28 of the first member 12 and the annular collar 31 of the second member 14 when the cable tensioner 10 is transported and fitted to the window regulator 52. The pin is, for example, inserted through a groove 20 and into the hole 40. Once the cable tensioner 10 is installed in the window regulator 52 and the protective sheath is inserted into the section 30a, the pin can be removed. The spring 18 is released, moving the second member 14 and applying tension to the cable 50.

As shown in FIG. 6, the invention also provides a window regulator 52 including the cable tensioner 10. The window regulator 52 includes a cable 50 passing into a protective sheath and running along a cable path. One end of the protective sheath rests against the second member 14, and the end may abut against another cable tensioner 10. A support is also arranged along the cable path that passes through the neck 32. The support is, for example, a slide guide track or a cable winding drum housing. The first member 12 rests against the support, and the second member 14 is moved relative to the first member 12. The movement of the second member 14 braces the protective sheath to increase tension in the cable 50, and the detent or detents 16 render the cable tensioner 10 irreversible. During the operation of the window regulator 52, play may occur, and the cable tensioner 10 compensates for any play. The window regulator 62 may include a slide 64 to be fixed to a window and a cable winding drum 66.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A cable tensioner comprising:
   a first member and a second member both defining a cable paths there through wherein the first member and the second member are helically moveable relative to each other along the cable path; and
   a detent permitting relative helical movement of the first member and the second member in a first direction while preventing the relative helical movement of the first member and the second member in a second opposite direction, wherein the detent is a single piece with one of the first member and the second member and the detent engages the other of the first member and the second member, and the detent is radially retractable with respect to the relative helical movement of the first member and the second member.

2. The cable tensioner according to claim 1, wherein the first direction is a first rotational direction and the second direction is a second rotational direction, and the detent is retractable in the first rotational direction and the detent is non-retractable in the second rotational direction.

3. The cable tensioner according to claim 1, further including a resilient member that applies a force on one of the first member and the second member relative to the other of the first member and the second member.

4. The cable tensioner according to claim 1, wherein the first member is a pipe and the second member is a tube, wherein the tube is translatably moveable along the pipe.

5. The cable tensioner according to claim 4, wherein the tube includes the detent.

6. The cable tensioner according to claim 5, wherein the cable path receives a cable, the pipe includes a groove extending along the cable path, and the detent is adapted to enter the groove.

7. The cable tensioner according to claim 6, wherein the tube further includes a second detent and the pipe further includes a second groove, and the detent and the second detent are adapted to enter the groove and the second groove respectively.

8. The cable tensioner according to claim 7, wherein a detent angular spacing between the detent and the second detent is not proportional to a groove angular spacing between the groove and the second groove.

9. The cable tensioner according to claim 7, wherein a detent angular spacing between the detent and the second detent is proportional to a groove angular spacing between the groove and the second groove.

10. The cable tensioner according to claim 5, wherein the detent includes a stop extending in a radial plane with respect to the tube.

11. The cable tensioner according to claim 5, wherein the detent includes a sloped face extending tangentially from the tube.

12. The cable tensioner according to claim 5, wherein the tube further includes a second detent and the pipe further includes grooves, wherein the detent and the second detent are adapted to enter the grooves.

13. The cable tensioner according to claim 12, wherein a detent angular spacing between the detent and the second detent is not proportional to a groove angular spacing between the grooves.

14. The cable tensioner according to claim 12, wherein a detent angular spacing between the detent and the second detent is proportional to a groove angular spacing between the grooves.

15. The cable tensioner according to claim 4, wherein the pipe includes the detent.

16. The cable tensioner according to claim 1, wherein the detent is integral with the second member to form a single unit.

17. The cable tensioner according to claim 1, wherein the one of the first member and the second member includes a second detent and the other of the first member and the second member includes grooves, and the detent and the second detent are adapted to enter the grooves.

18. The cable tensioner according to claim 1, wherein the first member is a female member and the second member is a male member, and the second member includes the detent.

19. The cable tensioner according to claim 1, wherein the second member includes a hole having a first section and a second section separated by an annular collar, and the annular collar receives a cable.

20. The cable tensioner according to claim 1, wherein the first member is a single element.

21. The cable tensioner according to claim 20, wherein the second member includes the detent.

22. A window regulator comprising:
a cable tensioner including:
a first member and a second member both defining a cable path, there through wherein the first member and the second member are helically moveable relative to each other along the cable path, and
a detent permitting relative helical movement of the first member and the second member in a first direction while preventing the relative helical movement of the first member and the second member in a second opposite direction, wherein the detent is a single piece with one of the first member and the second member and the detent engages the other of the first member and the second member, and the detent is radially retractable with respect to the relative helical movement of the first member and the second member; and
a cable, wherein the cable tensioner adjusts a level of tension in the cable.

23. The window regulator according to claim 22, wherein the first direction is a first rotational direction and the second direction is a second rotational direction.

* * * * *

UNITED STATES PATENT AND TRADEMARK OFFICE
CERTIFICATE OF CORRECTION

PATENT NO. : 7,325,360 B2
APPLICATION NO. : 10/878978
DATED : February 5, 2008
INVENTOR(S) : Mazouzi et al.

Page 1 of 1

It is certified that error appears in the above-identified patent and that said Letters Patent is hereby corrected as shown below:

Claim 1, Column 6, line 61: "paths" should read as --path--

Signed and Sealed this

Twenty-fourth Day of June, 2008

JON W. DUDAS
*Director of the United States Patent and Trademark Office*